US008447465B2

(12) United States Patent
Jiang et al.

(10) Patent No.: US 8,447,465 B2
(45) Date of Patent: May 21, 2013

(54) METHOD OF ACTIVATING A TELEMATICS DEVICE

(75) Inventors: Yi Jiang, Southfield, MI (US); Hiroaki Shibata, Novi, MI (US); Koji Shinoda, Farmington Hills, MI (US); Hyunju Seo, Northville, MI (US); Mustafa Mahmoud, Farmington, MI (US); Wan-ping Yang, Farmington Hills, MI (US); Thomas Shi, Rochester Hills, MI (US)

(73) Assignees: DENSO International America, Inc., Southfield, MI (US); Denso Corporation, Kariya-shi (JP)

( * ) Notice: Subject to any disclaimer, the term of this patent is extended or adjusted under 35 U.S.C. 154(b) by 563 days.

(21) Appl. No.: 12/711,389

(22) Filed: Feb. 24, 2010

(65) Prior Publication Data

US 2011/0208386 A1 Aug. 25, 2011

(51) Int. Cl.

| | |
|---|---|
| ***G01M 17/00*** | (2006.01) |
| ***B60T 7/12*** | (2006.01) |
| ***H04L 12/58*** | (2006.01) |
| ***H04W 68/00*** | (2009.01) |
| ***B60Q 1/00*** | (2006.01) |

(52) U.S. Cl.

USPC ....... 701/34.1; 701/29.1; 701/29.6; 701/31.5; 701/33.2; 701/117; 455/412.1; 455/414.1; 455/456.1; 455/466; 340/438

(58) Field of Classification Search

USPC ............... 701/29.1, 29.6, 31.4, 33, 117, 31.5, 701/33.2; 455/412.1, 456.1, 466, 414.1; 340/438

See application file for complete search history.

(56) References Cited

U.S. PATENT DOCUMENTS

| | | | | |
|---|---|---|---|---|
| 6,728,612 | B1 * | 4/2004 | Carver et al. | 701/34.3 |
| 6,947,755 | B1 * | 9/2005 | Gould et al. | 455/456.5 |
| 7,310,521 | B2 * | 12/2007 | Laghrari | 455/423 |
| 7,336,943 | B2 * | 2/2008 | Crocker et al. | 455/414.1 |
| 2005/0130670 | A1 * | 6/2005 | Gould et al. | 455/456.1 |
| 2005/0186941 | A1 * | 8/2005 | Gault et al. | 455/411 |
| 2006/0079203 | A1 * | 4/2006 | Nicolini | 455/411 |
| 2007/0100519 | A1 * | 5/2007 | Engel | 701/33 |
| 2008/0027605 | A1 * | 1/2008 | Oesterling | 701/33 |
| 2008/0046149 | A1 * | 2/2008 | Breed | 701/45 |
| 2008/0147265 | A1 * | 6/2008 | Breed | 701/30 |
| 2008/0161989 | A1 * | 7/2008 | Breed | 701/29 |
| 2009/0292417 | A1 * | 11/2009 | Ishikawa | 701/33 |

* cited by examiner

*Primary Examiner* — James Trammell
*Assistant Examiner* — Majdi Alsomiri
(74) *Attorney, Agent, or Firm* — Harness, Dickey & Pierce, P.L.C.

(57) ABSTRACT

A method of registering a vehicle with a call center of a telematics system may entail turning a key within a vehicle ignition to begin a call from a telematics control module within the vehicle to a server at a telematics call center, connecting the telematics control module within the vehicle to the server at the telematics service center, sending a health check request from the telematics control module within the vehicle to the server at the telematics service center; and receiving a health check confirmation in the telematics control module within the vehicle from the server at the telematics service center. The method may further entail inquiring if such a health check request request-confirmation was successful. The method may also include a call fail counter and a message fail counter to automatically re-initiate a health check request and a successful answer to such a request.

11 Claims, 3 Drawing Sheets

FIG 1
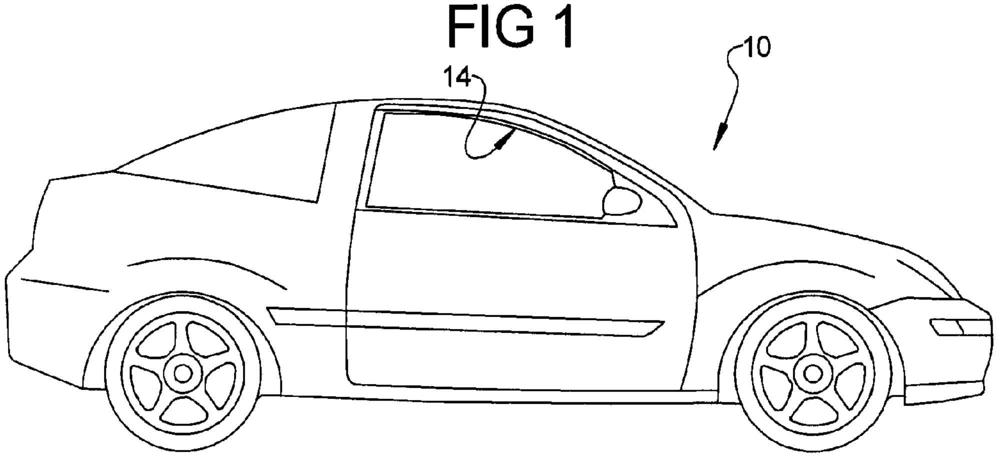
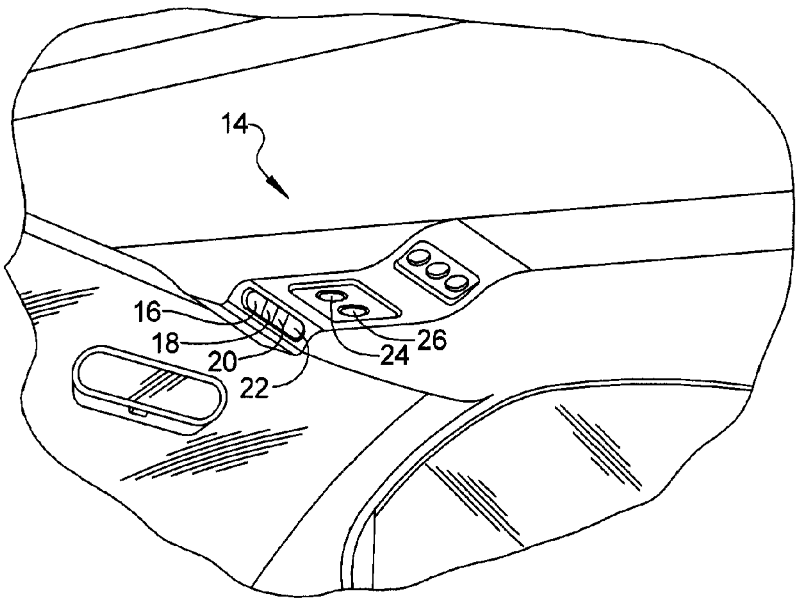
FIG 2

METHOD OF ACTIVATING A TELEMATICS DEVICE

FIELD

The present disclosure relates to a method of activating a telematics device, such as by using a health check process.

BACKGROUND

This section provides background information related to the present disclosure which is not necessarily prior art. Modern automotive vehicles may be equipped with a telematics system, which must be activated prior to the vehicle being sold to a customer. Activating such telematics systems may involve separately verifying operation and readiness of telematics sub-systems of the telematics system, such as a voice guidance system, a message exchange system and a user interface. Manipulation of buttons on a consul or control panel within the interior of a vehicle may be involved. Such manipulation of buttons may be time consuming when a large number of vehicles exist at a single location and/or activation of any telematics subsystem fails during an attempted activation. Activation may take place at a port of vehicle import, a factory parking lot, or a dealer vehicle center, as examples.

SUMMARY

This section provides a general summary of the disclosure, and is not a comprehensive disclosure of its full scope or all of its features. A method of registering a vehicle with a call center of a telematics system may entail turning a key within a vehicle ignition of a vehicle, invoking a call from a telematics control module within the vehicle to a server at a telematics call center, connecting the telematics control module within the vehicle to the server at the telematics service center, exchanging messages between the telematics control module and the telematics service center, inquiring if sending a health check request from the telematics control module within the vehicle to the server at the telematics service center and receiving a health check confirmation in the telematics control module within the vehicle from the server at the telematics service center was successful, and inquiring if sending a health check request from the telematics control module within the vehicle to the server at the telematics service center and receiving a health check confirmation in the telematics control module within the vehicle to the server at the telematics service center was successful.

The method may further entail inquiring whether the call was dropped when a negative response is received after inquiring if sending a health check request from the telematics control module within the vehicle to the server at the telematics service center and receiving a health check confirmation in the telematics control module within the vehicle to the server at the telematics service center was successful. Exchanging messages may entail sending a health check request from the telematics control module within the vehicle to the server at the telematics service center, and receiving a health check confirmation in the telematics control module within the vehicle from the server at the telematics service center. A health check request may be a request for specific types of information from the service center that pertains or relates to the vehicle from which the request came (e.g. if the vehicle needs service, if the vehicle is still an active participant or subscriber to the telematics system and eligible of being used within the telematics system).

The method may further entail confirming that exchanging messages has failed, inquiring if a message fail counter is less than a predetermined number, and when a message fail counter is less than a predetermined number, re-sending the health check request from the telematics control module within the vehicle to the server at the telematics service center and receiving the health check confirmation in the telematics control module within the vehicle from the server at the telematics service center.

As another example, a method of registering a vehicle with a call center of a telematics system may entail turning a key within a vehicle ignition of a vehicle, invoking a call from a telematics control module within the vehicle to a server at a telematics call center, inquiring whether the call from a telematics control module within the vehicle to a server at a telematics call center is connected, determining that the call from a telematics control module within the vehicle to a server at a telematics call center is not connected, and inquiring whether a call failure counter is less than a predetermined number. The method may further entail determining that a call failure counter is less than the predetermined number, increasing the call failure counter by one, and setting a message failure counter to zero. The method may also entail determining that a call failure counter is not less than the predetermined number, and setting the call failure counter to zero.

Still yet, another method of registering a vehicle with a call center of a telematics system may entail turning a key within an ignition of a vehicle, invoking a call (e.g. a cell phone call) from a telematics control module within the vehicle to a server at a telematics call center, connecting the telematics control module within the vehicle to the server at the telematics service center, and exchanging messages between the telematics control module and the telematics service center. Exchanging messages may entail sending a health check request from the telematics control module within the vehicle to the server at the telematics service center, and receiving a health check confirmation in the telematics control module within the vehicle from the server at the telematics service center. A health check request may requests specific types of information from the service center that pertains or relates to the vehicle from which the request came (e.g. if the vehicle needs service, if the vehicle is still an active participant or subscriber to the telematics system and eligible of being used within the telematics system). The method may then further entail inquiring if sending a health check request from the telematics control module within the vehicle to the server at the telematics service center and receiving a health check confirmation in the telematics control module within the vehicle from the server at the telematics service center was successful, determining that sending a health check request from the telematics control module within the vehicle to the server at the telematics service center and receiving a health check confirmation in the telematics control module within the vehicle to the server at the telematics service center was successful, inquiring whether the call was not dropped when a positive response to inquiring if sending a health check request from the telematics control module within the vehicle to the server at the telematics service center and receiving a health check confirmation in the telematics control module within the vehicle to the server at the telematics service center was successful; and inquiring whether a call failure counter is less than a predetermined number, determining that a call failure counter is less than the predetermined number, increasing the call failure counter by one, and setting a message failure counter to zero, determining that a call failure counter is not less than the predetermined number, and setting the call failure counter to zero.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a side view of a vehicle within which part of a telematics system may reside;

FIG. 2 is a perspective view of an overhead console where a telematics system interface may reside;

Corresponding reference numerals indicate corresponding parts throughout the several views of the drawings.

DETAILED DESCRIPTION

Figure 3:
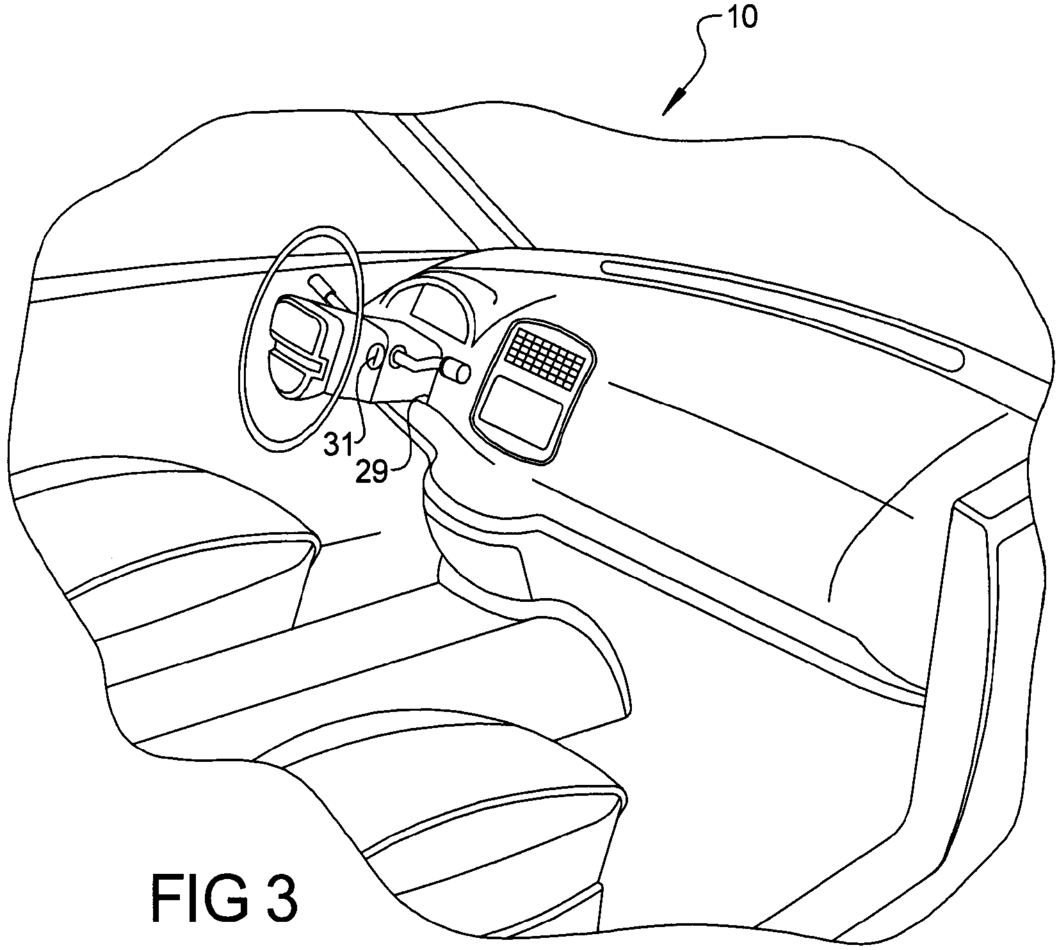
FIG. 3 is a perspective view of a vehicle interior depicting an example location of a vehicle ignition.

Example embodiments will now be described more fully with reference to FIGS. 1-5 of the accompanying drawings. FIG. 1 depicts a vehicle 10 which may employ part of an overall telematics system 12 (FIG. 3). Regarding the present teachings, telematics refers to the convergence of telecommunications and information processing in automobiles, and includes emergency warning systems, GPS navigation, integrated hands-free cell phones and cell phone calling, wireless safety communications and automatic driving assistance systems. Telematics may also include onboard electronics to provide services related to vehicle diagnostics, local entertainment, road and travel directions, general information, and safety information, as examples, to vehicle occupants.

A vehicle may be equipped with on-board components to permit full participation of a vehicle occupant in telematics system 12. For instance, with further reference including FIGS. 2 and 3, vehicle 10 may be equipped with an interior console 14, which may house various buttons and lights (e.g. LED or other lights), related to use of telematics system 12. As an example, console 14 may be equipped with a live button 16, which by pressing may permit a user to contact a live person, who may provide advice or information to a vehicle occupant. An emergency button 18 which by pressing may permit a user to contact a person who is trained in handling emergency situations, such as medical emergencies. A phone button 20 which by pressing may permit a user to access complete cell phone capabilities through a microphone and speakers, which also may be resident in the console 14 or other vehicle interior location. Still yet, an on-off button 22 may be pressed to enable and disable use of telematics system 12. An indicator light 24 and an indicator light 26 may be used to indicate a specific status of telematics system 12 to a vehicle occupant. Instead of buttons 16, 18, 20, 22 and lights 24, 26 being located in a console 14, which may be an overhead console, buttons 16, 18, 20, 22 and lights 24, 26 may be located in a peripheral location 28 of a rearview mirror 30, in a vehicle dash, or other interior location convenient for a vehicle driver to access.

Figure 4:
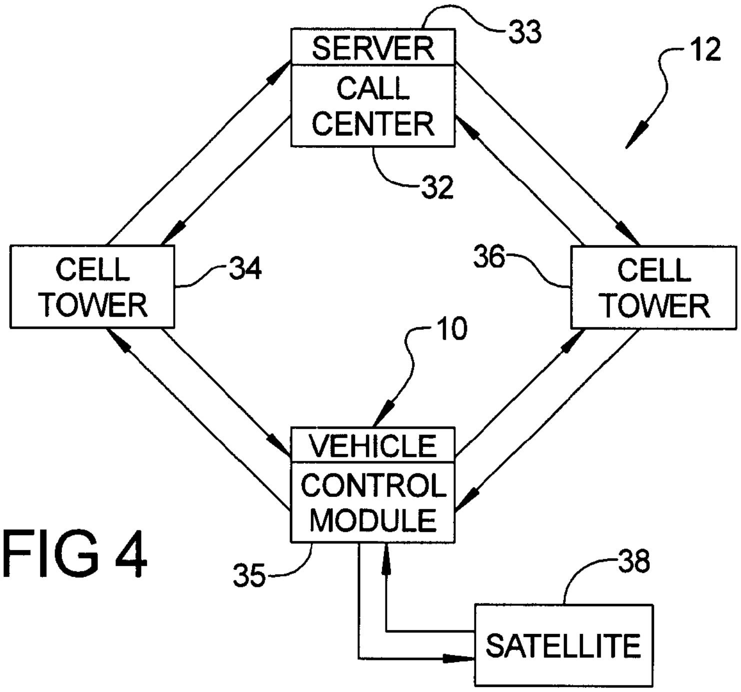
FIG. 4 is a block diagram visually depicting items utilized in a telematics system.

FIG. 4 depicts major components utilized by telematics system 12. More specifically, telematics system 12 may involve communications between vehicle 10, a call center 32, a cell tower 34, and a cell tower 36. For instance, a vehicle occupant of vehicle 10 may desire to place a call to call center 32, which may be routed through cell tower 34 or cell tower 36 from vehicle 10 to call center 32. When communication is established, call center 32 may then communicate from call center 32 to vehicle 10 through cell tower 34 or cell tower 36. Such communications may be utilized when a user is activating a telematics system for the first time, for example. The physical location of vehicle 10 may be determined by call center 32, such as during an emergency call from an occupant of vehicle 10 through communications between vehicle 10 and satellite 38. Upon a geographic location of vehicle 10 being determined, the vehicle location may then be transmitted to call center 32 through cell tower 34 or cell tower 36, for example.

Figure 5:
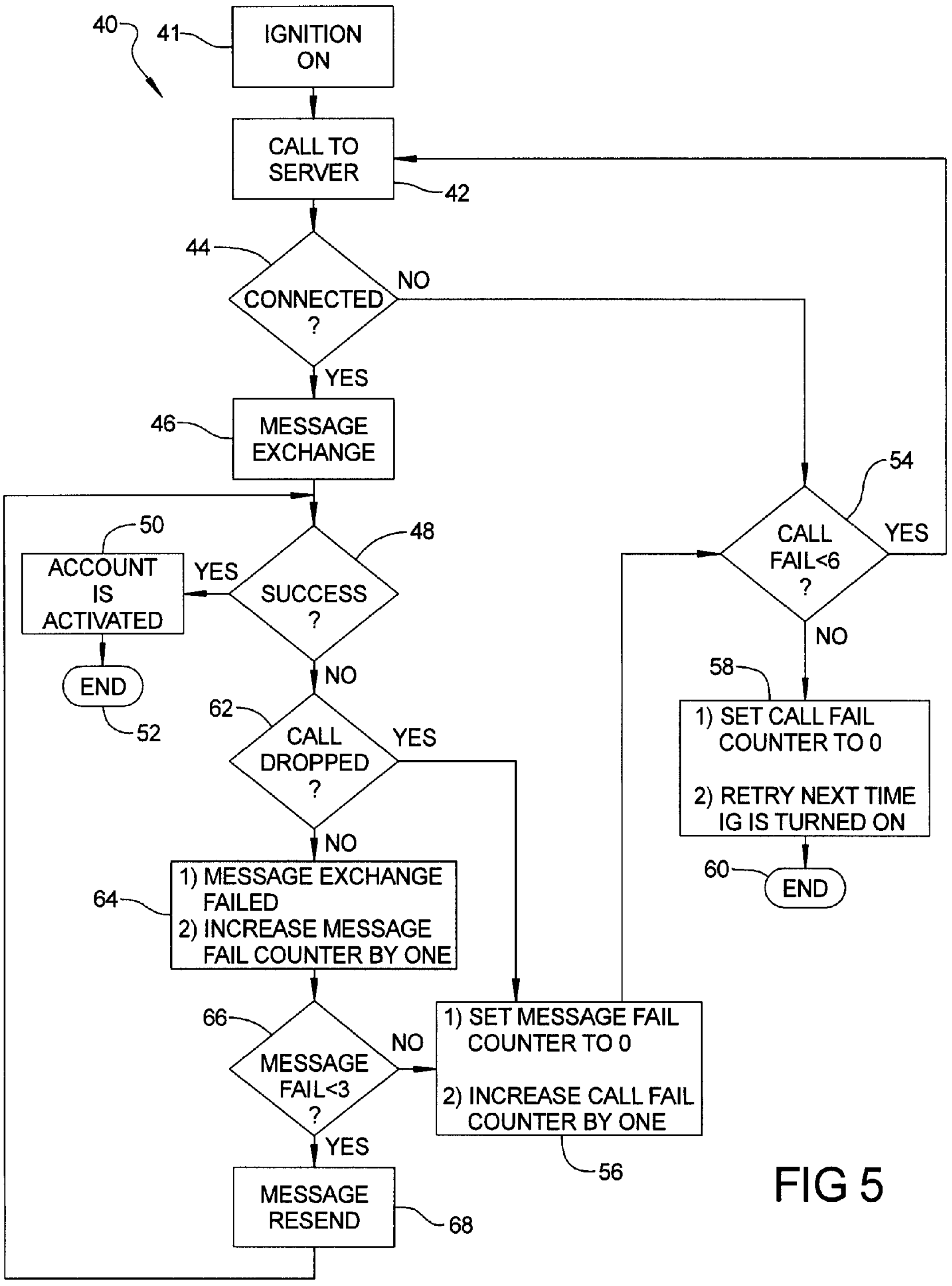
FIG. 5 is a flowchart of a method of controlling a telematics system.

Turning now to FIG. 5, a method of activating a telematics system, a portion of such a system may be installed with a vehicle, will be explained using steps of flowchart 40 and again, FIGS. 1-4. The logic of flowchart 40 may begin at step 41 when, for example, a key 29 is inserted into an ignition 31 and turned. Thus, step 41 may represent turning a key within a vehicle ignition of a vehicle, which may initiate activation of telematics components within vehicle 10. Upon turning key 29 and turning ignition 31, communication, such as a telephone call, may be made from telematics telematics control module 35 of vehicle 10 via one or more cell towers 34, 36 to establish contact or a connection with a telematics server 33 within or affiliated with call center 32. The logic then proceeds to step 42 where a call to a computer server of a call center 32 may be initiated from within vehicle 10 to call center 32 to begin registration of telematics system with call center 32. Thus, step 42 may represent invoking a call from a telematics control module 35 within vehicle 10 to a server 33 at telematics call center 32. Proceeding to step 44, connection between telematics call center 32 and telematics telematics control module 35. Thus, step 44 may represent connecting the telematics control module within the vehicle to the server at the telematics service center.

If successful contact has been established by telematics control module 35, the logic proceeds to step 46 where message exchange may occur. Message exchange at step 46 may include telematics server 33 responding with specific communication tones, such as phone tones, to telematics control module 35 within vehicle 10, thus establishing message exchange. Thus, step 46 may represent exchanging messages between the telematics control module 35 and the telematics server 33 of telematics service center 32. Exchanging messages may further entail sending a “health check request” from the telematics control module 35 within the vehicle to the server at the telematics service center and receiving a health check confirmation in the telematics control module within the vehicle from the server at the telematics service center. A health check request may be a request for specific types of information from the service center that pertain to or relate to a vehicle from which the request came (e.g. if the vehicle needs service, if the vehicle is still an active participant or subscriber to the telematics service and therefore eligible of participating in benefits of a telematics system). Stated slightly differently, a health check request may be a request for specific types of information from the service center that pertains or relates to the vehicle from which the request came (e.g. if the vehicle needs service, if the vehicle is still an active participant or subscriber to the telematics system and eligible of being used within the telematics system.

At step 48, the logic verifies that telematics control module 35, as part of in-vehicle telematics components, has established successful contacts with telematics server 33 of call center 32. Thus, step 48 may represent inquiring if sending a health check request from the telematics control module within the vehicle to the server at the telematics service center and receiving a health check confirmation in the telematics control module within the vehicle from the server at the telematics service center has been successful. Successful contact occurs when an acceptable series of tones are transmitted from telematics service center 32 to telematics control module 35. If successful contact is verified, the logic proceeds to step 50, where a telematics account for vehicle 10 is deemed to be successfully established. Upon successful establishment of vehicle 10 within a telematics database of telematics server 33, for example, of call center 32, the logic may end at step 52. The logic may then begin again at step 42 for another (i.e. a different vehicle). Registration of multiple vehicles may be conducted simultaneously using the logic of flowchart 40.

At step 44, if telematics control module 35 is unable to establish initial contact with then the logic proceeds to step 54, where the logic inquires if the call fail counter, which monitors the number of call failures from telematics control module 35 of in-vehicle telematics device to telematics server 33 of call center 32, is less than a predetermined number, such as six (6). Thus, step 54 may represent determining that a call failure counter is less than a predetermined number. The call failure counter may begin with zero (0) upon turning of key 29 in ignition 31 when logic of flowchart 40 is executed.

If the call fail counter is less than six (6), then the logic proceeds back to step 42. From step 42 another call from telematics control module 35 of vehicle 10 to telematics server 33 of call center 32 may be initiated. However, at step 54, if the call failure counter is not less than six (6), then the logic proceeds to step 58 where the call failure counter is set to zero (0) and the logic of flowchart 40 is not attempted until another turn of key 29 in ignition 31. Thus, step 58 may represent a determination that a call failure counter is not less than the predetermined number and setting the call failure counter to zero. Thus, a registration process may end at step 60 until another turn of key 29 in ignition 31 occurs.

Continuing with the logic of flowchart 40, after attempting message exchange at step 46, an inquiry into success of such message exchange at step 48 is made. If the reply to success of such an inquiry at step 48 is "no;" that is, an unsuccessful message exchange has occurred, the logic proceeds to step 62 where an inquiry is made as to whether the failure in communication established between the telematics control module 35 and the telematics server 33 was a dropped call. Thus, step 62 may represent inquiring whether the call was dropped when a negative response to inquiring if sending a health check request from the telematics control module within the vehicle to the server at the telematics service center and receiving a health check confirmation in the telematics control module within the vehicle to the server at the telematics service center was successful. Dropping of such a cell phone call from telematics control module 35 of vehicle 10 to call center 32 may be for one or more reasons, such as interference from weather, interference from a building or geographic land features, as examples. If the response to the inquiry at step 62 is "yes,' indicating that the call has been dropped, then the logic proceeds to step 56 where the call fail counter is increased by one (1) and a message fail counter is set to zero (0). Message fail counter may begin with zero (0), and not one (1), when logic of flowchart 40 is executed. Thus, step 56 may represent increasing the call failure counter by one and setting a message failure counter to zero. The logic may then proceed to step 54, which has been previously discussed. If the response to the inquiry at step 62 is "no," indicating that the call has not been dropped, then the logic proceeds to step 64, where the logic determines that the call has not been dropped, but rather the message exchange has failed. At step 64 the message fail counter may be increased by one (1). Thus, step 64 may represent confirming that exchanging messages has failed and increasing the message fail counter by one (1). The logic may then proceed to step 66 where an inquiry is made if the message fail counter is less than three (3). Thus, step 66 may represent inquiring if a message fail counter is less than a predetermined number. If the message fail counter is not less than three (3), then the logic proceeds to step 56, which has been previously explained above; however, if the message fail counter is less than three (3), then the logic proceeds to step 68 and an attempt at message resend is made. In other words, step 68 may represent when a message fail counter is less than a predetermined number, re-sending the health check request from the telematics control module within the vehicle to the server at the telematics service center and receiving the health check confirmation in the telematics control module within the vehicle from the server at the telematics service center. The logic may then proceed to step 48 and any subsequent steps, which have been explained above.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A method of registering a vehicle with a call center of a telematics system, the method comprising:

turning a key within a vehicle ignition of a vehicle;

invoking a call from a telematics control module within the vehicle to a server at the call center;

connecting the telematics control module within the vehicle to the server at the call center;

exchanging messages between the telematics control module and the call center, wherein the step of exchanging messages further comprises:

sending a health check request from the telematics control module within the vehicle to the server at the call center; and receiving a health check confirmation in the telematics control module within the vehicle from the server at the call center;

inquiring if sending the health check request from the telematics control module within the vehicle to the server at the call center and receiving the health check confirmation in the telematics control module within the vehicle from the server at the call center was successful; and inquiring if sending the health check request from the telematics control module within the vehicle to the server at the call center and receiving the health check confirmation in the telematics control module within the vehicle to the server at the call center was successful; and inquiring whether the call was dropped when a negative response to inquiring if sending the health check request from the telematics control module within the vehicle to the server at the call center and receiving the health check confirmation in the telematics control module within the vehicle to the server at the call center was successful.

2. The method of claim 1, further comprising:

confirming that exchanging messages has failed.

3. The method of claim 2, further comprising:

inquiring if a message fail counter is less than a predetermined number.

4. The method of claim 3, further comprising:

when the message fail counter is less than the predetermined number, re-sending the health check request from the telematics control module within the vehicle to the server at the call center and receiving the health check confirmation in the telematics control module within the vehicle from the server at the call center.

5. A method of registering a vehicle with a call center of a telematics system, the method comprising:

turning a key within a vehicle ignition of a vehicle to an on position;

automatically invoking a call from a telematics control module within the vehicle to a server at the call center in response to the turning of the key within the vehicle ignition of the vehicle to the on position;

inquiring whether the call from the telematics control module within the vehicle to the server at a the call center is connected;

determining that the call from the telematics control module within the vehicle the server at a the call center is not connected; and inquiring whether a call failure counter is less than a predetermined number.

6. The method according to claim 5, further comprising:

determining that the call failure counter is less than the predetermined number;

increasing the call failure counter by one; and setting a message failure counter to zero.

7. The method according to claim 5, further comprising:

determining that the call failure counter is not less than the predetermined number; and setting the call failure counter to zero.

8. A method of registering a vehicle with a call center of a telematics system, the method comprising:

turning a key within a vehicle ignition of a vehicle;

invoking a call from a telematics control module within the vehicle to a server at the call center;

connecting the telematics control module within the vehicle to the server at the call center;

exchanging messages between the telematics control module and the call center, wherein the exchanging messages comprise:

sending a health check request from the telematics control module within the vehicle to the server at the call center; and receiving a health check confirmation in the telematics control module within the vehicle from the server at the call center;

inquiring if sending the health check request from the telematics control module within the vehicle to the server at the call center and receiving the health check confirmation in the telematics control module within the vehicle from the server at the call center was successful;

inquiring whether the call was dropped upon confirming that sending the health check request from the telematics control module within the vehicle to the server at the call center and receiving the health check confirmation in the telematics control module within the vehicle to the server at the call center was not successful; and inquiring whether a call failure counter is less than a predetermined number.

9. The method according to claim 8, further comprising:

determining that the call failure counter is less than the predetermined number;

increasing the call failure counter by one; and setting a message failure counter to zero.

10. The method according to claim 8, further comprising:

determining that the call failure counter is not less than the predetermined number; and setting the call failure counter to zero.

11. The method according to claim 8, further comprising:

determining that sending the health check request from the telematics control module within the vehicle to the server at the call center and receiving the health check confirmation in the telematics control module within the vehicle to the server at the call center was successful; and registering the vehicle within the server at the call center.

* * * * *

UNITED STATES PATENT AND TRADEMARK OFFICE

CERTIFICATE OF CORRECTION

PATENT NO. : 8,447,465 B2
APPLICATION NO. : 12/711389
DATED : May 21, 2013
INVENTOR(S) : Yi Jiang et al.

It is certified that error appears in the above-identified patent and that said Letters Patent is hereby corrected as shown below:

In the Claims

Col. 7, line 50, Claim 5, line 8, after "at", delete "a", therefore

Col. 7, line 53, Claim 5, line 10, after "vehicle", insert -- to --, therefore

Col. 7, line 53, Claim 5, line 10, after "at", delete "a", therefore

Signed and Sealed this
Thirteenth Day of August, 2013

Teresa Stanek Rea
*Acting Director of the United States Patent and Trademark Office*